(12) United States Patent
Kuriyagawa (10) Patent No.: US 9,905,335 B2
(45) Date of Patent: Feb. 27, 2018

(54) WATER STOP TREATMENT METHOD AND INSULATING COVERED ELECTRIC WIRE

(71) Applicant: YAZAKI CORPORATION, Tokyo (JP)

(72) Inventor: Masaru Kuriyagawa, Utsunomiya (JP)

(73) Assignee: YAZAKI CORPORATION, Tokyo (JP)

( * ) Notice: Subject to any disclaimer, the term of this patent is extended or adjusted under 35 U.S.C. 154(b) by 34 days.

(21) Appl. No.: 14/811,043

(22) Filed: Jul. 28, 2015

(65) Prior Publication Data

US 2015/0332807 A1 Nov. 19, 2015

Related U.S. Application Data

(62) Division of application No. 13/504,666, filed as application No. PCT/JP2010/068879 on Oct. 25, 2010, now Pat. No. 9,108,576.

(30) Foreign Application Priority Data

Oct. 30, 2009 (JP) .................................. 2009-250786

(51) Int. Cl.
*H01R 4/20* (2006.01)
*H01B 7/28* (2006.01)
(Continued)

(52) U.S. Cl.
CPC ........... *H01B 7/28* (2013.01); *B60R 16/0215* (2013.01); *H01B 7/285* (2013.01); *H01R 4/18* (2013.01); *H01R 4/70* (2013.01); *Y10T 29/49195* (2015.01)

(58) Field of Classification Search
CPC ................................. H01R 4/20; H01R 9/0503
(Continued)

(56) References Cited

U.S. PATENT DOCUMENTS 3,525,799 A * 8/1970 Ellis ....................... H01R 4/723
 174/84 R
5,347,090 A * 9/1994 Cerda ..................... H01R 4/04
 156/296

(Continued)

FOREIGN PATENT DOCUMENTS

JP 11-98763 A 4/1999
JP 2006202676 A 8/2006
(Continued)

OTHER PUBLICATIONS

European Search Reported dated Jul. 15, 2014 issued by the European Patent Office in counterpart European Patent application No. 10826679.2.

(Continued)

*Primary Examiner* — Chau N Nguyen
(74) *Attorney, Agent, or Firm* — Sughrue Mion, PLLC (57) ABSTRACT

A water stopping treatment simply and assuredly prevents water from moving or entering to a circuit board or the like. A one end of a core wire (41) is exposed from an insulation cover (42). An exposing part (A) that is peeled off from the insulation cover (42) and exposed from the insulation cover (42) is formed at an arbitrary position from the one end to the other end of the core wire. A water stopping agent (48) is filling from the exposing part (A) toward the other end of the core wire (41).

5 Claims, 11 Drawing Sheets

(51) Int. Cl.
  *B60R 16/02* (2006.01)
  *H01B 7/285* (2006.01)
  *H01R 4/18* (2006.01)
  *H01R 4/70* (2006.01)

(58) Field of Classification Search
  USPC ........ 173/23 R, 74 R, 88 R, 84 R; 174/23 R, 174/74 R, 88 R, 84 R
  See application file for complete search history.

(56) References Cited

U.S. PATENT DOCUMENTS

| | | | | |
|---|---|---|---|---|
| 7,277,628 | B2* | 10/2007 | Giamati | ............. H01C 1/08 219/541 |
| 8,183,472 | B2 | 5/2012 | Ooki et al. | |
| 2010/0212936 | A1* | 8/2010 | Arai | ............. H01B 7/285 174/23 R |
| 2011/0048762 | A1 | 3/2011 | Sawamura | |

FOREIGN PATENT DOCUMENTS

| | | |
|---|---|---|
| JP | 2007-141620 A | 6/2007 |
| JP | 2007207738 A | 8/2007 |
| JP | 2008159575 A | 7/2008 |
| JP | 2008226525 A | 9/2008 |
| JP | 2008226526 A | 9/2008 |
| JP | 2008234974 A | 10/2008 |
| JP | 2009054406 A | 3/2009 |
| JP | 2009152012 A | 7/2009 |
| JP | 2010-129229 A | 6/2010 |

OTHER PUBLICATIONS

International Search Report dated Jan. 11, 2011 in counterpart international application No. PCT/JP2010/068879.
Written Opinion dated Jan. 11, 2011 in counterpart international application No. PCT/JP2010/068879.
Communication from Japanese Patent Office Action dated Jan. 21, 2014, issued in counterpart Japanese Application No. 2009-250786.

* cited by examiner

WATER STOP TREATMENT METHOD AND INSULATING COVERED ELECTRIC WIRE

CROSS-REFERENCE TO RELATED APPLICATIONS

This application is a Divisional application of U.S. application Ser. No. 13/504,666, filed on Apr. 27, 2012 which is a 371 National Stage of Application PCT/JP2010/068879 filed Oct. 25, 2010, which claims priority from Japanese Patent Application No. 2009-250786 filed Oct. 30, 2009. The disclosures of the prior applications are incorporated herein by reference in their entireties.

TECHNICAL FIELD

The present invention relates to an insulating covered electric wire connected to a drain wire drawn out from a terminal of a shield electric wire and a water stop treatment method of the insulating covered electric wire.

BACKGROUND ART

For a wire harness arranged in an engine room of a vehicle, a shield wire is used which has a drain wire provided together with an insulating covered electric wire. By installing the drain wire, noise can be more effectively prevented from being mixed in a signal supplied to a core wire of the insulating covered electric wire. Since the drain wire needs to be electrically connected to a braided wire for a shield, the drain wire itself is not coated with insulation.

However, when the shield wire is arranged in a watering area, for instance, when the engine room is to be cleaned, there is a fear that water droplets putting on the drain wire due to the watering area may move along the drain wire to be put on a circuit or circuit elements on a circuit board connected to the drain wire and give a damage such as a short-circuit accident thereto.

Figure 6:
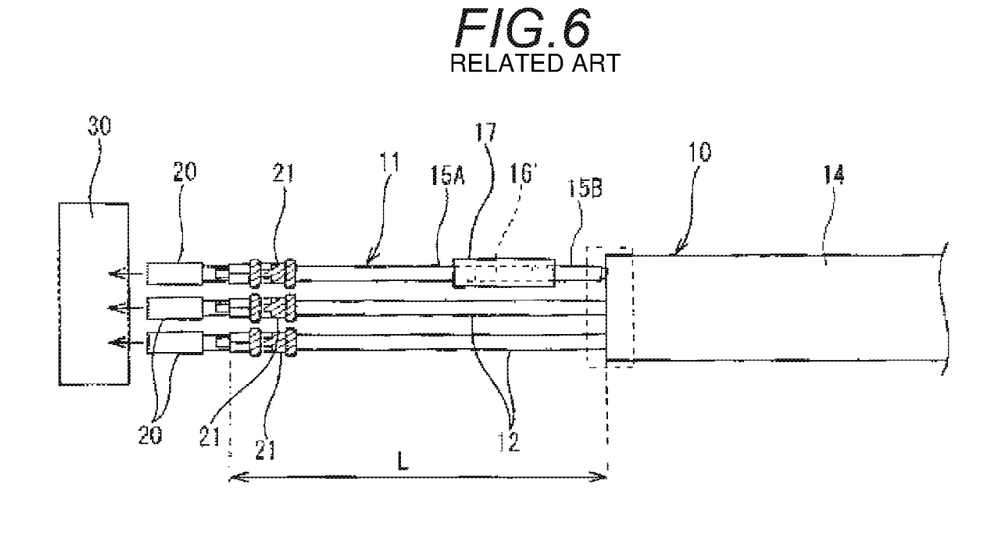
FIG. 6 is a front view showing a usual shield wire.
Figure 7:
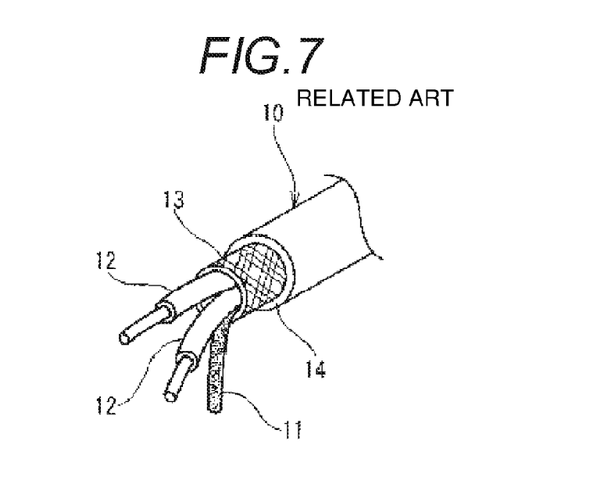
FIG. 7 is a perspective view of the shield wire shown in FIG. 6.
Figure 8:
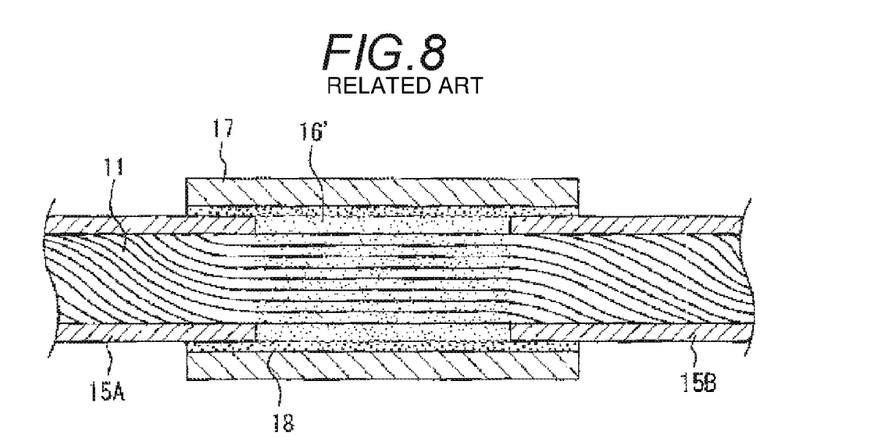
FIG. 8 is a sectional view of a water stop structure of a drain wire shown in FIG. 6.

As compared therewith, a shield wire is proposed in Patent Literature 1 in which a water stop treatment is inexpensively applied to a drain wire. As shown in FIGS. 6 to 8, the shield wire 10 is arranged in a watering area of an engine room of a motor vehicle. A terminal of the shield wire 10 is connected to a connector 30. The connector 30 is fitted to a connector accommodating part of an ECU (not shown in the drawing) for an EFI (an electronically controlled fuel injection) arranged in the watering area. The water stop treatment is applied to the drain wire 11 drawn out from a peeled terminal of the shield wire 10.

As shown in FIG. 7, the shield wire 10 includes two insulating covered electric wires 12 (referred to as core wires 12, hereinafter) serving as signal lines and the drain wire 11. The drain wire 11 and the core wires 12 are sequentially coated with a shield layer 13 made of metal foil and a sheath 14. The drain wire 11 is allowed to come into contact with the shield layer 13 so as to be electrically conducted thereto. In the shield wire 10, the sheath 14 and the shield layer 13 are cut and peeled by the shortest dimension L of about 40 mm from an end to draw out the drain wire 11 and the core wires 12.

The drain wire 11 drawn out from the terminal of the shield wire 10 is formed with a twisted wire formed by twisting a plurality of strands. As shown in FIG. 8, the terminal side and the peeled end side of the drain wire 11 are coated with non-watertight thermal shrinkage tubes 15A, 15B to thermally shrink the terminal side and the peeled end side. Further, molten hot melt 16' obtained by heating and melting a hot melt tube is infiltrated into the strands of the drain wire 11 between the non-watertight thermal shrinkage tubes 15A, 15B to fill the strands with the hot melt 16' and solidify the strands.

A part from the non-watertight thermal shrinkage tube 15A of the terminal side of the drain wire 11 to the non-watertight thermal shrinkage tube 15B of the peeled end side is coated with a watertight thermal shrinkage tube 17 so as to cover an entire part of the position filled with the hot melt 16' and thermally shrink that part. To an inner peripheral surface of the watertight thermal shrinkage tube 17, a thermally molten type water stopping agent 18 (refer it to as a "water stopping agent 18", hereinafter) is previously applied. The water stopping agent 18 is molten during a thermal shrinkage to fill the position filled with the hot melt 16' and outer peripheries of both sides in the axial direction thereof with the stopping agent.

In the drain wire 11 in the part filled with the hot melt 16', the twisted wire is untwisted so that the hot melt 16' is easily infiltrated between the strands. Further, to a boundary part between an end of the non-watertight thermal shrinkage tube 15A and a pressure contact part of a terminal 20, a rubber plug 21 is attached. The rubber plugs 21 are also attached to boundary parts between other core wires 12 and the terminals 20.

CITATION LIST

Patent Literature

Patent Literature 1: JP-A-2008-234974

SUMMARY OF THE INVENTION

Technical Problem

In the water stop structure of the shield electric wire disclosed in Patent Literature 1, an outer periphery of the bare drain wire exposed from the peeled end is coated with the non-watertight thermal shrinkage tube, the hot melt tube and the watertight thermal shrinkage tube which are laminated. Since large numbers and kinds of tubes are used, they are factors that prevent a wire harness from being compact and light. Thus, a below-described combination is taken into consideration. Namely, while the water stop treatment is not applied to the drain wire of the shield electric wire, another electric wire to which the water stop treatment is applied is prepared separately from the shield electric wire. The drain wire of the shield electric wire is connected to the separately-prepared electric wire through a joint terminal. Thus, the shield electric wire is prevented from being enlarged due to the water stop treatment. Further, the water droplets moving along the drain wire are stopped by the separately-prepared electric wire.

As the above-described water stopping agent, a water stopping agent is desirably used that has fluidity under an initial state immediately after the stopping agent is dropped, and is solidified after the water stopping agent is dropped, but, has a flexibility, an elasticity and a good sealing property. For instance, may be employed a silicon resin having a natural hardening property or a photo-hardening property, or a poly-functional monomer such as an epoxy resin, polyethylene, polyester, polybutadinen acrylate. In the present exemplary embodiment, when an air pressure changes to air pressure in an airtight chamber as described below, the water stopping agent dropped on the core wires needs to be infiltrated between the core wires respectively.

Accordingly, the water dropping agent needs to hold the fluidity for a prescribed time as described above.

In the case of the structure that the drain wire of the above-described shield electric wire is connected to the separately-prepared electric wire through the joint terminal, the water stop treatment to the core wires of the separately-prepared electric wire needs to be carefully carried out so that the water stopping agent does not prevent an electric conduction or a connection strength between the joint terminal and the core wires. Namely, when the core wires of the separately-prepared electric wire are filled with the water stopping agent, a part which comes into contact with the joint terminal needs to be paid attention not to be filled with the water stopping agent.

The present invention is devised by considering the above-described problems. It is an object of the present invention to provide a water stop treatment method which applies a water stop treatment to an insulating covered electric wire so as not to prevent an electric conduction or a connection strength between a core wire and a joint terminal when a drain wire of a shield electric wire is connected to the insulating covered electric wire to which the water stop treatment is applied through the joint terminal, and an insulating covered electric wire to which the water stop treatment is applied.

Solution to Problem

In order to achieve the above-described object, a water stop treatment method according to the present invention includes below-described items (1) and (2).
(1) Including:
  a cover dividing process for peeling off an insulation cover of an insulating covered electric wire having the other end to which a ground terminal can be connected at two positions, to thereby divide an insulation cover into a first sheath part of the other end side of the insulating covered electric wire, a second sheath part of one end side of the insulating covered electric wire and a third sheath part provided between the first sheath part and the second sheath part;
  a core wire exposing process for moving the third sheath part toward the one end side of the insulating covered electric wire along a core wire, to thereby forming an exposing part which a part of the core wire is exposed between the first sheath part and the third sheath part in the insulating covered electric wire;
  a pressurizing process for pressurizing a closed vessel under a state in which an area from the exposing part of the insulating covered electric wire to the one end of the insulating covered electric wire is accommodated in the closed vessel and the other end of the insulating covered electric wire is arranged outside the closed vessel;
  a water stopping agent dropping process for dropping a water stopping agent to the part of the core wire exposed from the exposing part; and
  a connecting process for pulling out the second sheath part and connecting a joint terminal to the one end of the insulating covered electric wire exposed from the insulation cover.
(2) Including:
  a cover dividing process for peeling off an insulation cover of an insulating covered electric wire having the other end to which a ground terminal can be connected at two positions, to thereby divide an insulation cover into a first sheath part of the other end side of the insulating covered electric wire, a second sheath part of one end side of the insulating covered electric wire and a third sheath part provided between the first sheath part and the second sheath part;
  a core wire exposing process for moving the third sheath part toward the one end side of the insulating covered electric wire along a core wire, to thereby forming an exposing part which a part of the core wire is exposed between the first sheath part and the third sheath part in the insulating covered electric wire;
  a depressurizing process for depressurizing a closed vessel under a state in which an area from the exposing part of the insulating covered electric wire to the one end of the insulating covered electric wire is arranged outside the closed vessel and the other end of the insulating covered electric wire is accommodated in the closed vessel;
  a water stopping agent dropping process for dropping a water stopping agent to the part of the core wire exposed from the exposing part; and
  a connecting process for pulling out the second sheath part and connecting a joint terminal to the one end of the insulating covered electric wire exposed from the insulation cover.

According to the water stop treatment method having the structure of the above-described item (1) or (2), since the water stopping agent dropped to the exposing part from which a part of the core wire is exposed is infiltrated toward the other end opposite to the one end of the insulating covered electric wire to which the joint terminal is connected, the water stopping agent does not adhere to a part of the core wire of the insulating covered electric wire which comes into contact with the joint terminal. Accordingly, the water stopping agent can be prevented from interfering an electric conduction or connection strength between the core wire and the joint terminal.

In order to achieve the above-described object, an insulating covered electric wire according to the present invention includes below-described item (3).
(3) An insulating covered electric wire, comprising:
  a core wire; and
  an insulation cover with which the core wire is covered, wherein
  the core wire has one end exposed from the insulation cover, and an exposing part exposed from the insulation cover by peeling off the insulation cover is formed at an arbitrary position from the one end to the other end of the core wire, and
  a water stopping agent is filling from the exposing part toward the other end of the core wire.

According to the insulating covered electric wire having the structure of the above-described item (3), the water stopping agent does not adhere to a part of the core wire of the insulating covered electric wire which comes into contact with a joint terminal. Accordingly, the water stopping agent can be prevented from checking an electric conduction or connection strength between the core wire and the joint terminal.

Advantageous Effects of the Invention

According to the water stop treatment method and the insulating covered electric wire of the present invention, water can be avoided from entering the ground terminal side of the insulating covered electric wire from a drain wire drawn out from a terminal of a shied wire. Accordingly, the water can be simply and assuredly prevented from moving (entering) to a circuit or electronic parts of a circuit board through the insulating covered electric wire. Consequently, the insulation deterioration or the short-circuit accident of the circuit or the electronic parts can be assuredly avoided by a simple and light structure.

Further, since the water stopping agent dropped to the exposing part from which a part of the core wire is exposed is infiltrated toward the other end opposite to the one end of the insulating covered electric wire to which the joint terminal is connected, the water stopping agent does not adhere to a part of the core wire of the insulating covered electric wire which comes into contact with the joint terminal. Accordingly, the water stopping agent can be prevented from checking an electric conduction or connection strength between the core wire and the joint terminal.

As described above, the present invention is briefly explained. Further, when modes for carrying out the invention to be described below will be read by referring to the attached drawings, details of the present invention will be more clarified.

MODES FOR CARRYING OUT THE INVENTION

Now, a preferable exemplary embodiment of an insulating covered electric wire and a water stop treatment method therefore according to a mode for carrying out the invention will be described below by referring to the drawings. The insulating covered electric wire having a ground terminal in one end will be described as an example.

Figure 1:
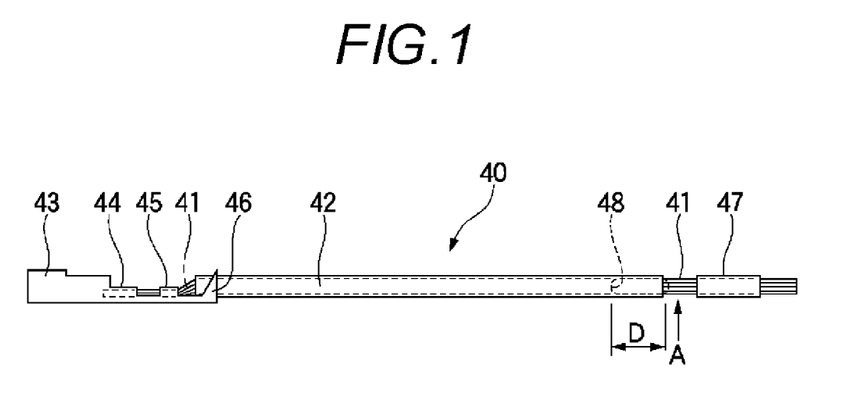
FIG. 1 is a front view conceptually showing an exemplary embodiment of an insulating covered electric wire according to the present invention.
Figure 2:
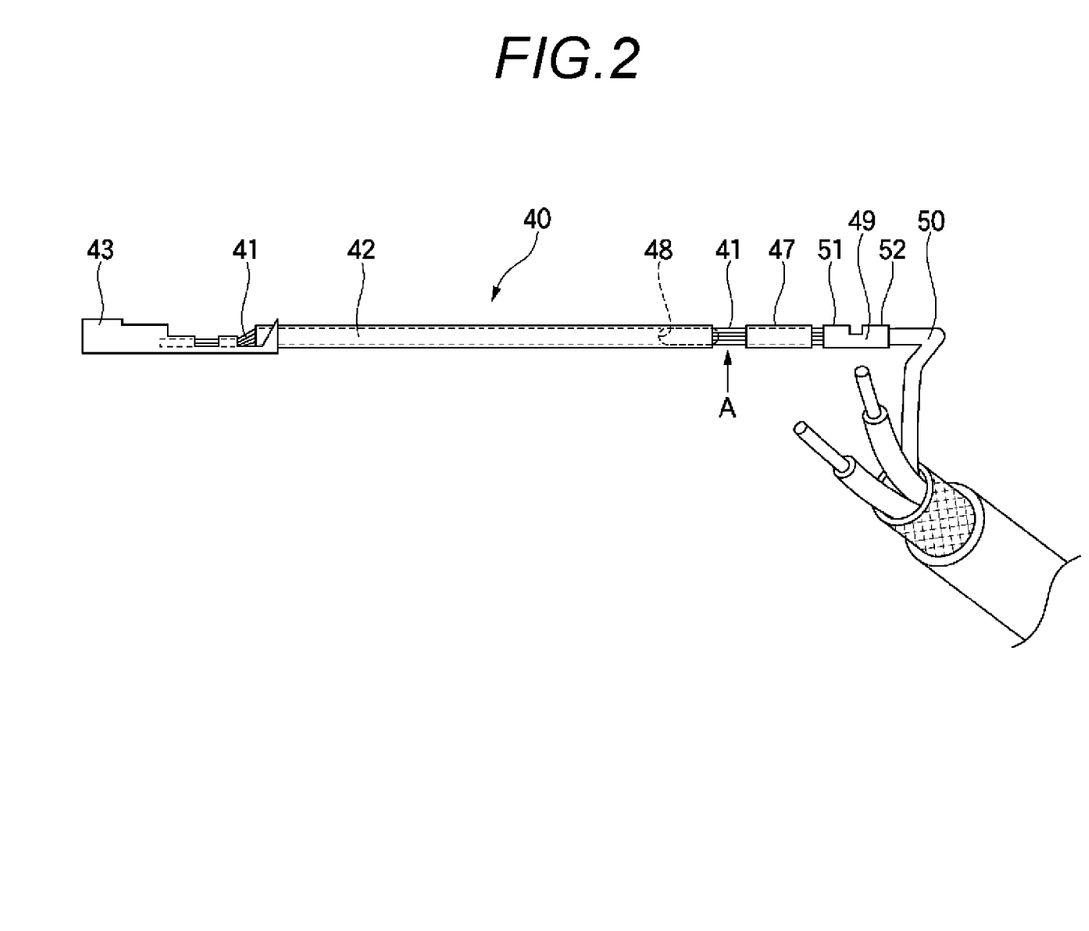
FIG. 2 is a front view showing a state in which the insulating covered electric wire shown in FIG. 1 is connected to a drain wire.
Figure 3:
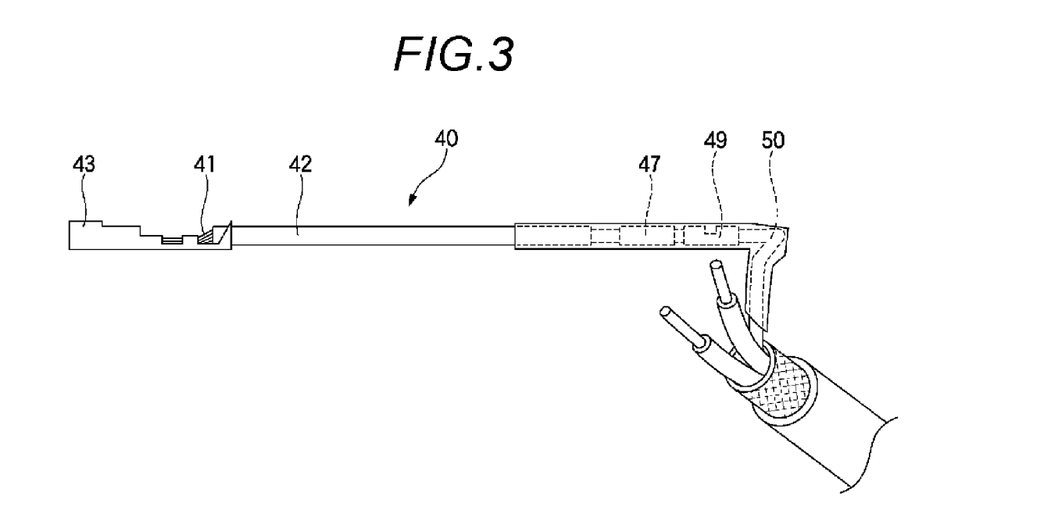
FIG. 3 is a front view showing a state in which the insulating covered electric wire and the drain wire shown in FIG. 2 are covered with a binding tape.

Here, FIG. 1 is a front view conceptually showing an exemplary embodiment of an insulating covered electric wire according to the embodiment. FIG. 2 is a front view showing a state in which the insulating covered electric wire shown in FIG. 1 is connected to a drain wire. FIG. 3 is a front view showing a state in which the insulating covered electric wire and the drain wire shown in FIG. 2 are covered with a binding tape. FIG. 4A to FIG. 4I are explanatory diagrams showing procedures for applying a water stop treatment to the insulating covered electric wire shown in FIG. 1. FIG. 5A to FIG. 5I are explanatory diagrams showing another procedures for applying a water stop treatment to the insulating covered electric wire shown in FIG. 1.

The insulating covered electric wire according to the exemplary embodiment of the present invention is connected to a drain wire drawn out together with core wires from a peeled terminal of a shield wire arranged in a watering area of an engine room in, for instance, a vehicle. The drain wire includes a lot of electrically conductive strands and is not covered with an insulation cover, and is allowed to come into contact with a shield layer made of a metallic braided tube or a metal foil. Any water stop treatment is not applied to the drain wire.

An insulating covered electric wire 40 has an outer periphery of a core wire (an inner conductor) 41 covered with an insulation cover 42. A prescribed length of the core wire (the inner conductor) 41 is drawn out from a peeled terminal as one end of the insulation cover 42. A ground terminal 43 is connected to the drawn core wire 41. In order to connect the ground terminal 43 to the core wire 41, under a state in which conductor barrels 44, 45, 46 of the ground terminal 43 are opened, the core wire 41 of a side that the insulation cover 42 of the insulating covered electric wire 40 is removed is initially set between the conductor barrels 44, 45. Further, the insulation cover 42 is set in the conductor barrel 46. Then, after the core wire 41 and the insulation cover 42 are set, a process is carried out for deforming the conductor barrels 44, 45, 46 so as to be closed. Thus, the barrels 44, 45, 46 respectively crimp the core wire 41 and the insulation cover 42.

On the other hand, one end part (an end part opposite to the connecting side of the ground terminal 43) is divided to form a sheath part 47. The sheath part 47 is shifted in position toward the one end part of the insulating covered electric wire 40 along the core wire 41. Due to the positional shift of the sheath part 47, the core wire 41 is exposed outside the insulation cover 42 in the shifted position. From an exposing part A that the core wire 41 is exposed, a liquid water stopping agent 48 is press-fitted into a gap between the core wire 41 and the insulation cover 42 as described below. The water stopping agent 48 is infiltrated toward the ground terminal 43 of the insulating covered electric wire 40 and then solidified. Thus, the water stop treatment is applied to the insulating covered electric wire 40. FIG. 1 shows a state in which the water stopping agent 48 is supplied over a length D of the insulating covered electric wire 40 and solidified.

To the one end part of the core wire 41 of the insulating covered electric wire 40 opposite to the ground terminal 43 to which the water stop treatment is applied in such a way, a drain wire 50 of a shield wire is crimped and connected by using a joint terminal 49 as shown in FIG. 2. The joint terminal 49 has two sets of barrels 51, 52 in a longitudinal direction. One set of barrel 51 is crimped to an end part of the core wire 41 and the other set of barrel 52 is crimped to an end part of the drain wire 50, respectively.

Further, in the insulating covered electric wire 40 as shown in FIG. 2, the insulation cover 42, the exposing part A, the sheath part 47, the joint terminal 49 and the drain wire 50 have their outer peripheries coated with a thin and light binding tape (a protecting tape) as shown in FIG. 3. The insulating covered electric wire 40 is coated with the binding tape, but the binding tape has no water-tightness. Accordingly, when a section from a position near the divided position to the drain wire 50 is exposed to water, the water enters the drain wire. However, since the water stop treatment is applied to the insulating covered electric wire 40 by using the water stopping agent 48, the water is prevented from entering the ground terminal 43 side from the drain wire 50 side. Accordingly, an insulation deterioration or a short-circuit accident of a circuit board or electronic parts connected to the ground terminal 43 or the drain wire 50 can be assuredly avoided by a compact and light structure.

Now, a procedure of the water stop treatment of the insulating covered electric wire 40 will be described below. Here, an example is described that a water stop procedure is applied to the insulating covered electric wire 40 having the ground terminal 43 in one end.

Figure 4A:
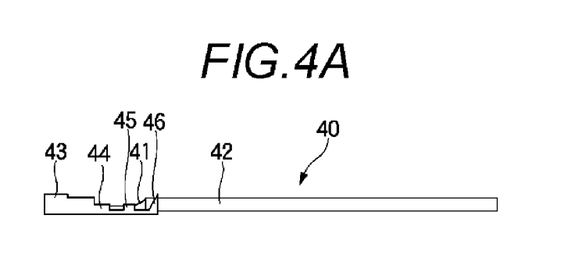
FIG. 4A is an explanatory diagram showing one procedure for applying a water stop treatment to the insulating covered electric wire shown in FIG. 1.

Initially, the insulating covered electric wire 40 having a prescribed length as shown in FIG. 4A is prepared which has the ground terminal 43 connected to the one end. In the insulating covered electric wire 40, a prescribed length of the core wire (the inner conductor) 41 is drawn out from one end (the ground terminal 43 side). To the drawn-out core wire 41, the ground terminal 43 is connected. The ground terminal 43 is connected to the core wire 41 by crimping the barrels 44, 45 forming the ground terminal 43 to the core wire 41. Further, the barrel 46 is crimped so as to compress the end part of the insulation cover 42.

Figure 4B:
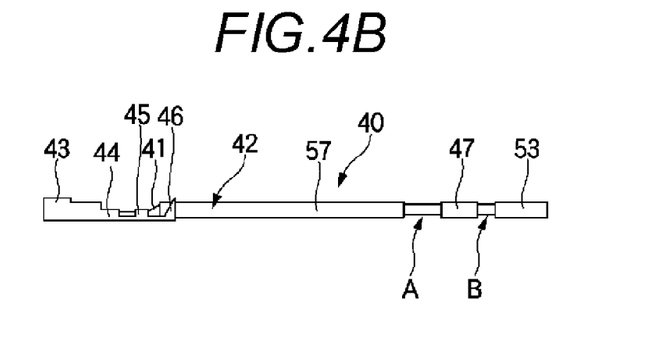
FIG. 4B is an explanatory diagram showing one procedure for applying a water stop treatment to the insulating covered electric wire shown in FIG. 1.

Then, in the one end part (the end part opposite to the connecting side of the ground terminal 43) of the insulating covered electric wire 40, the insulating covered electric wire 40 is divided at two positions so as to cut only the insulation cover 42 in round slices. Thus, as shown in FIG. 4B, three sheath parts 47, 53 and 57 having prescribed lengths are formed (a cover dividing process). The two sheath parts 47 and 53 of the divided sheath parts 47, 53 and 57 from the one end part (the end part opposite to the connecting side of the ground terminal 43) of the insulating covered electric wire 40 have such a length as to slide the sheath parts 47 and 53 along the core wire 41. Then, the sheath parts 47 and 53 are moved to a direction opposite to the ground terminal 43 side (shift positions). In accordance with the movement of the sheath parts 47 and 53, the core wire 41 is partly exposed in two exposing parts A and B (a core wire exposing process).

An exposing length of the exposing part A of the exposing parts A and B is set to an space in which the below-described water stopping agent (water stopping liquid) can be smoothly dropped and infiltrated (enter) into the insulation cover 42 and is slightly larger than the size of a water droplet. Further, the exposing part B does not necessarily need to be provided. Further, the sheath part 53 is pulled out from the other end of the core wire 41 and discarded after the below-described water stop treatment is finished.

Figure 4C:
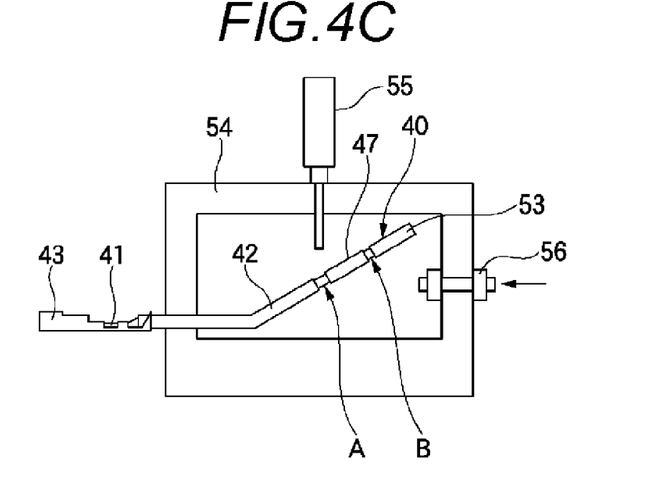
FIG. 4C is an explanatory diagram showing one procedure for applying a water stop treatment to the insulating covered electric wire shown in FIG. 1.

Then, as shown in FIG. 4C, a pressurized type closed vessel 54 is prepared. In the closed vessel 54, a water stopping agent drop nozzle 55 and an intake nozzle 56 of compressed air are provided. An end part of the water stopping agent drop nozzle 55 faces an inner part of the closed vessel 54 and functions to drop the water stopping agent (the water stopping liquid) downward. On the other hand, an end part of the intake nozzle 56 of the compressed air also faces the inner part of the closed vessel 54 and functions to supply air of high pressure to the closed vessel 54 from a side part of the closed vessel 54.

In the above-described closed vessel 54, the insulating covered electric wire 40 is arranged so that the exposing part A of the insulating covered electric wire 40 to the one end (the end part opposite to the connecting side of the ground terminal 43) of the insulating covered electric wire 40 is accommodated in the closed vessel and the one end (the connecting side of the ground terminal 43) of the insulating covered electric wire 40 is arranged outside the closed vessel. In a part of a side wall of the closed vessel 54 through which the insulating covered electric wire 40 passes, a seal material (not shown in the drawing) is provided.

Further, the insulating covered electric wire 40 is bent at a prescribed position to incline the insulating covered electric wire 40 so that the sheath part 53 side is located at a high position. On the other hand, the ground terminal 43 side is held at a low position. Then, under this state, the compressed air of high pressure is supplied to the closed vessel 54 from the intake nozzle 56 (a pressurizing process). The air supplied to the closed vessel 54 in such a way is sent between strands of the core wire 41 respectively in a divided surface facing the exposing part A or to the gap between the core wire 41 and the insulation cover 42 from the exposing part A of the core wire 41. Further, the air supplied to the gap is discharged from the end of the insulating covered electric wire 40 in the fixing side of the ground terminal 43.

Figure 4D:
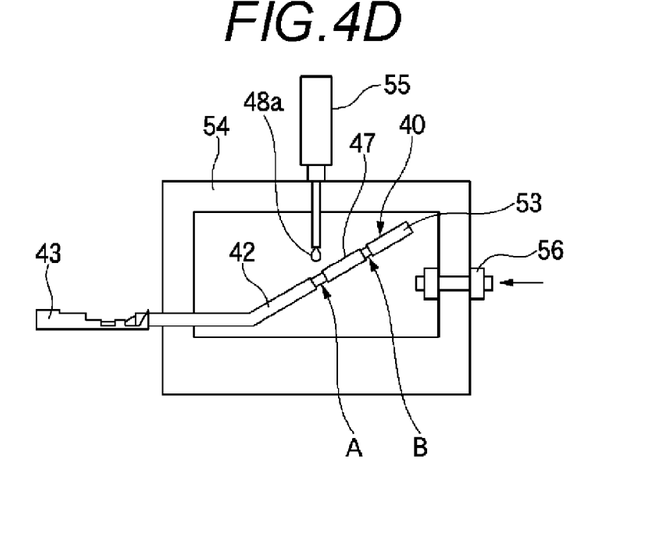
FIG. 4D is an explanatory diagram showing one procedure for applying a water stop treatment to the insulating covered electric wire shown in FIG. 1.
Figure 4E:
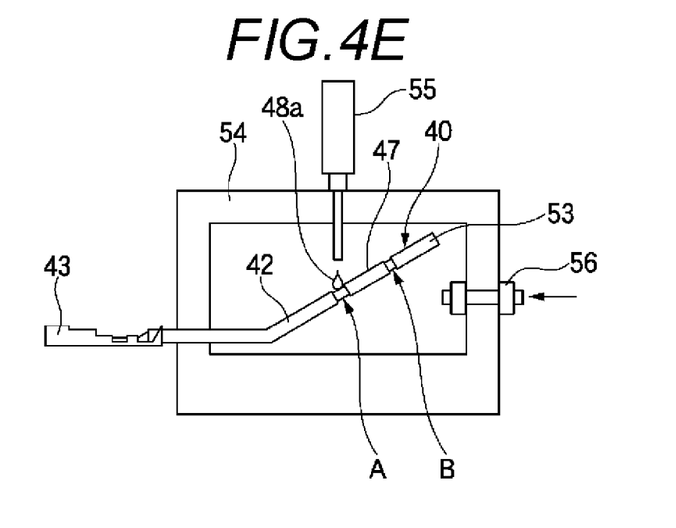
FIG. 4E is an explanatory diagram showing one procedure for applying a water stop treatment to the insulating covered electric wire shown in FIG. 1.
Figure 4F:
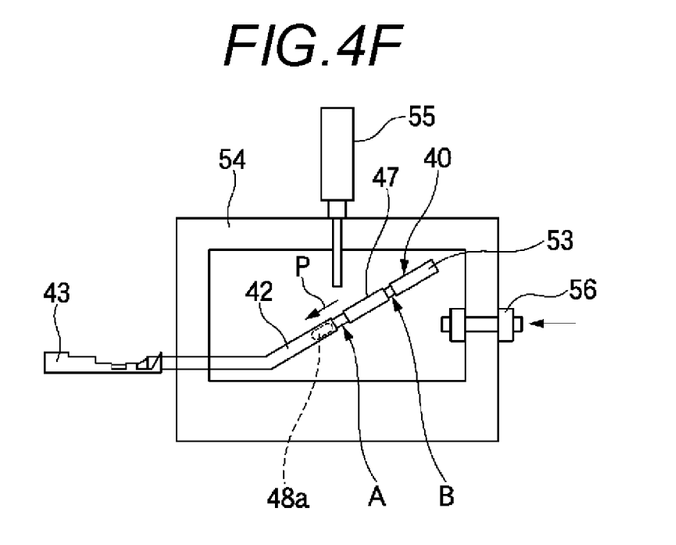
FIG. 4F is an explanatory diagram showing one procedure for applying a water stop treatment to the insulating covered electric wire shown in FIG. 1.

Subsequently, the water stopping agent is fed to the water stopping agent drop nozzle 55 from a water dropping agent tank (not shown in the drawing). The liquid water stopping agent 48a is dropped from the end of the water stopping agent drop nozzle 55 as shown in FIG. 4D (a water stopping agent dropping process). The dropped water stopping agent 48a is temporarily mounted on the exposing part A of the core wire 41 in the state of a water droplet as shown in FIG. 4E, immediately infiltrated into the strands of the core wire 41 respectively or the gap between the core wire 41 and the insulation cover 42 and sucked toward a direction shown by an arrow P in FIG. 4F.

Figure 4G:
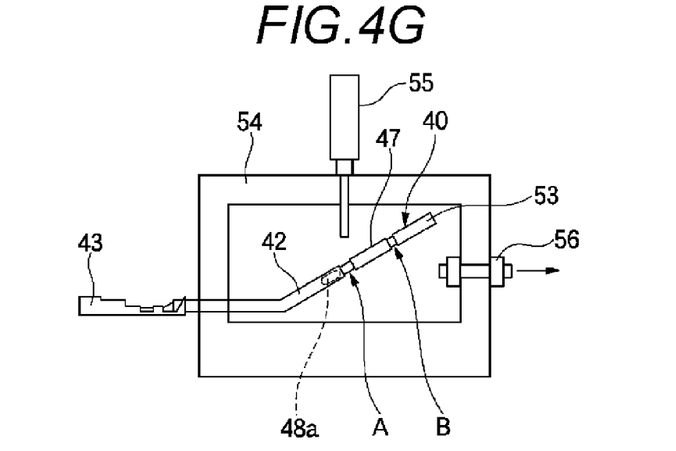
FIG. 4G is an explanatory diagram showing one procedure for applying a water stop treatment to the insulating covered electric wire shown in FIG. 1.

When the strands of the core wire 41 or the gap between the core wire 41 and the insulation cover 42 are filled with a prescribed amount of the water stopping agent 48a (over a prescribed length), a dropping operation of the water stopping agent 48a by the water stopping agent drop nozzle 55 is stopped as shown in FIG. 4G and the air supply from the intake nozzle 56 is also stopped. Then, after the water stopping agent 48a between the strands of the core wire 41 and in the gap between the core wire 41 and the insulation cover 42 is completely solidified, the closed vessel 54 is degassed toward a direction shown by an arrow by the intake nozzle (a depressurizing process). Thus, the pressure in the closed vessel 54 is reduced to return to ordinary pressure (atmospheric pressure).

Figure 4H:
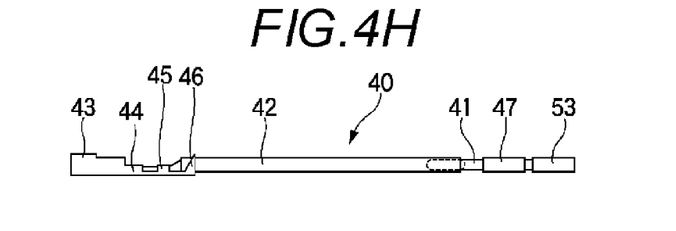
FIG. 4H is an explanatory diagram showing one procedure for applying a water stop treatment to the insulating covered electric wire shown in FIG. 1.
Figure 4I:
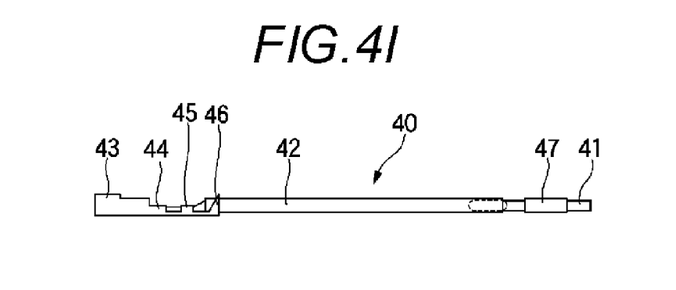
FIG. 4I is an explanatory diagram showing one procedure for applying a water stop treatment to the insulating covered electric wire shown in FIG. 1.

Thus, the insulating covered electric wire 40 to which the water stop treatment is applied is taken out from the closed vessel 54. Then, the bent part is stretched straight as shown in FIG. 4H. Then, the one sheath part 53 located in the end of the insulating covered electric wire 40 stretched straight are pulled out from the core wire 41 and discarded. As shown in FIG. 4I, only the sheath part 47 is left.

Then, the part of the core wire 41 from which the sheath part 53 is pulled out is connected to the one end of a separately-prepared drain wire 50 by using the joint terminal 49 as shown in FIG. 2. In the insulating covered electric wire shown in FIG. 2 to which the water stop treatment is applied, even when the drain wire 50 is watered, the water does no pass through the insulating covered electric wire from the drain wire 50 side to reach the ground terminal 43. Accordingly, the circuit board or circuit parts or electronic parts such as a connector to which the ground terminal is connected do not cause the insulation deterioration or the short-circuit accident.

Now, another procedure of the water stop treatment of the insulating covered electric wire 40 will be described below by referring to FIG. 5A to FIG. 5I. Here, an example is also described that a water stop treatment is applied to the insulating covered electric wire 40 having the ground terminal 43 in one end.

Figure 5A:
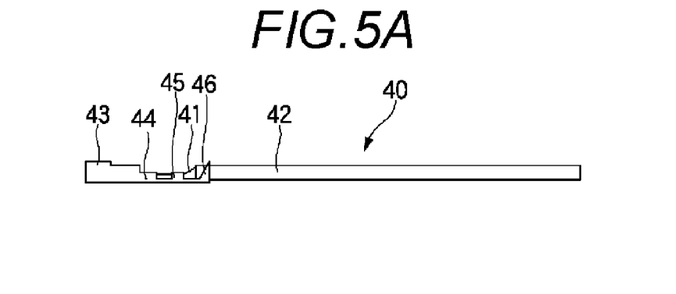
FIG. 5A is an explanatory diagram showing another one procedure for applying a water stop treatment to the insulating covered electric wire shown in FIG. 1.

Initially, the insulating covered electric wire 40 having a prescribed length as shown in FIG. 5A is prepared which has the ground terminal 43 connected to the one end. In the insulating covered electric wire 40, a prescribed length of the core wire (the inner conductor) 41 is drawn out from one end (the ground terminal 43 side). To the drawn out core wire 41, the ground terminal 43 is connected. The ground terminal 43 is connected to the core wire 41 by crimping the barrels 44 and 45 forming the ground terminal 43 to the core wire 41. Further, the barrel 46 is crimped so as to compress the end part of the insulation cover 42.

Figure 5B:
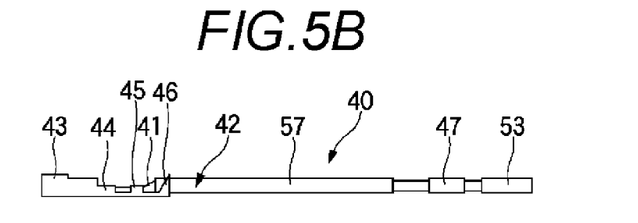
FIG. 5B is an explanatory diagram showing another one procedure for applying a water stop treatment to the insulating covered electric wire shown in FIG. 1.

Then, in the one end part (the end part opposite to the connecting side of the ground terminal 43) of the insulating covered electric wire 40, the insulating covered electric wire is divided at two positions so as to cut only the insulation cover 42 in round slices. Thus, as shown in FIG. 5B, three sheath parts 47, 53 and 57 having prescribed lengths are formed (a cover dividing process). The two sheath parts 47 and 53 of the divided sheath parts 47, 53 and 57 from the one end part (the end part opposite to the connecting side of the ground terminal 43) of the insulating covered electric wire 40 have such a length as to slide the sheath parts 47 and 53 along the core wire 41. Then, the sheath parts 47 and 53 are moved to a direction opposite to the ground terminal 43 side (shift positions). In accordance with the movement of the sheath parts 47 and 53, the core wire 41 is partly exposed in two exposing parts A and B (a core wire exposing process).

An exposing length of the exposing part A of the exposing parts A and B is set to an space in which the below-described water stopping agent (water stopping liquid) can be smoothly dropped and infiltrated (enter) into the insulation cover 42 and is slightly larger than the size of a water droplet. Further, the exposing part B does not necessarily need to be provided. Further, the sheath part 53 is pulled out from the other end of the core wire 41 and discarded after the below-described water stop treatment is finished.

Figure 5C:
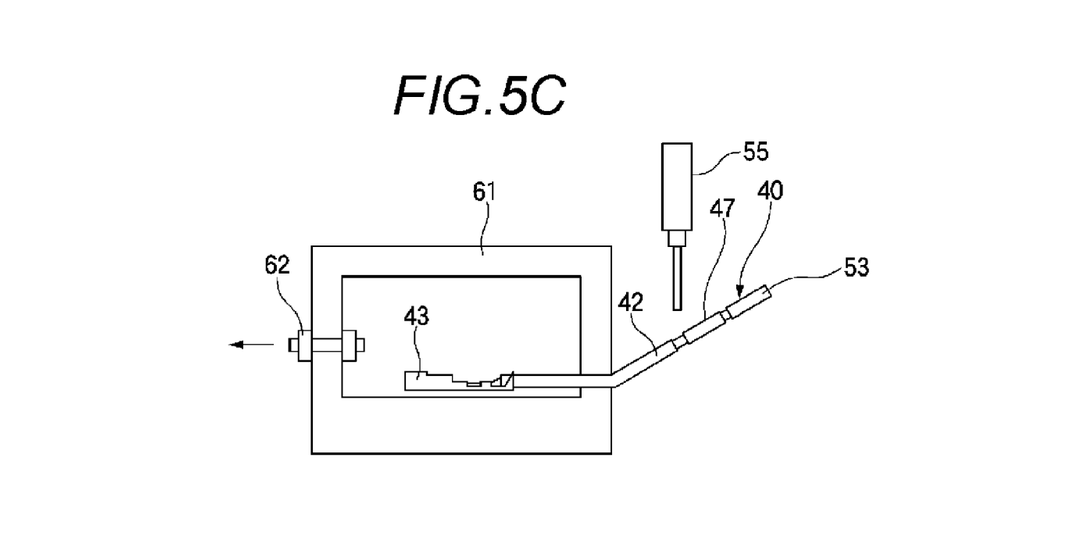
FIG. 5C is an explanatory diagram showing another one procedure for applying a water stop treatment to the insulating covered electric wire shown in FIG. 1.

Then, as shown in FIG. 5C, a depressurizing type closed vessel 61 is prepared. In an outer part of the closed vessel 61, a water stopping agent drop nozzle 55 is provided and an exhaust (depressurizing) nozzle 62 is attached to the closed vessel 61. An end part of the water stopping agent drop nozzle 55 functions to drop the water stopping agent (the water stopping liquid) downward. On the other hand, one end part of the exhaust nozzle 62 faces an inner part of the closed vessel 61 and functions to exhaust (suck out) air in the closed vessel 61 from a side part of the closed vessel 61.

In the above-described closed vessel 61, the insulating covered electric wire 40 is arranged so that the exposing part A of the insulating covered electric wire 40 to the one end (the end part opposite to the connecting side of the ground terminal 43) of the insulating covered electric wire 40 is arranged outside the closed vessel and the one end (the connecting side of the ground terminal 43) of the insulating covered electric wire 40 is accommodated in the closed vessel 61. In a part of a side wall of the closed vessel 61 through which the insulating covered electric wire 40 passes, a seal material (not shown in the drawing) is provided. In this case, the exposing part A is located just below the water stopping agent drop nozzle 55.

Further, the insulating covered electric wire 40 is bent to incline the insulating covered electric wire 40 from a prescribed position so that the sheath part 53 side is located at a high position. The ground terminal 43 side is held at a low position. Then, under this state, the air in the closed vessel 61 is exhausted (sucked in) from the exhaust nozzle 62 (a depressurizing process). Accordingly, outside air flows through the strands of the core wire 41 respectively or the gap between the core wire 41 and the insulation cover 42 in the insulation cover 42 toward the ground terminal 43 side from a divided surface side of the exposing part A located outside the closed vessel 61. Further, the outside air is introduced outside the closed vessel 61 from the exhaust nozzle 62.

Figure 5D:
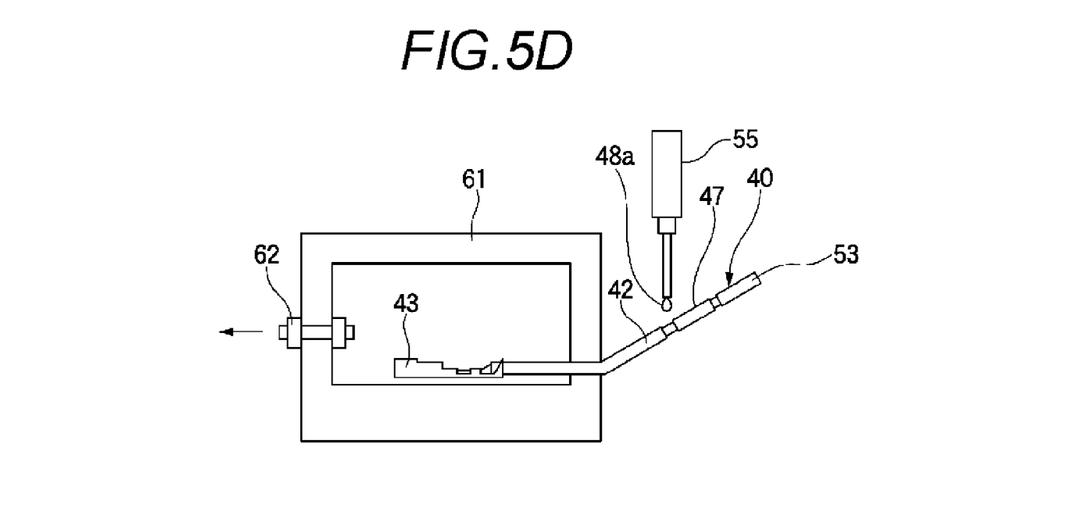
FIG. 5D is an explanatory diagram showing another one procedure for applying a water stop treatment to the insulating covered electric wire shown in FIG. 1.
Figure 5E:
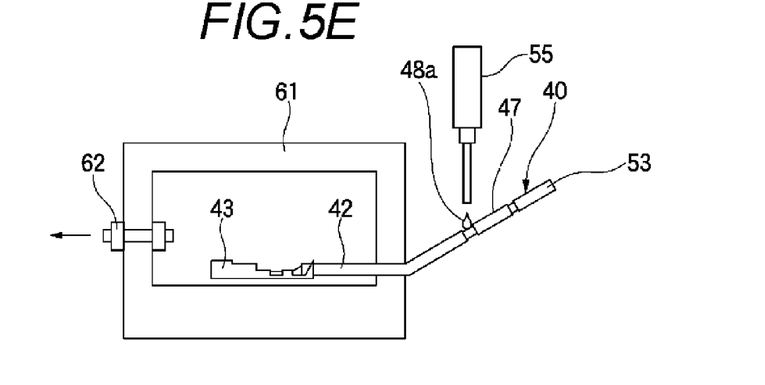
FIG. 5E is an explanatory diagram showing another one procedure for applying a water stop treatment to the insulating covered electric wire shown in FIG. 1.
Figure 5F:
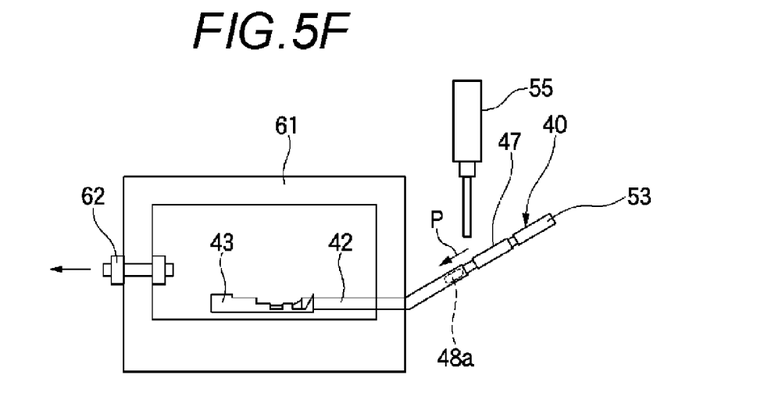
FIG. 5F is an explanatory diagram showing another one procedure for applying a water stop treatment to the insulating covered electric wire shown in FIG. 1.

On the other hand, the water stopping agent is fed to the water stopping agent drop nozzle 55 from a water dropping agent tank (not shown in the drawing). Then, the liquid water stopping agent 48a is dropped from the end of the water stopping agent drop nozzle 55 as shown in FIG. 5D (a water stopping agent dropping process). The dropped water stopping agent 48a is temporarily mounted on the exposing part A of the core wire 41 in the state of a water droplet as shown in FIG. 5E, and immediately infiltrated into the strands of the core wire 41 respectively or the gap between the core wire 41 and the insulation cover 42 in accordance with a flow of the air and sucked toward a direction shown by an arrow P in FIG. 5F.

Figure 5G:
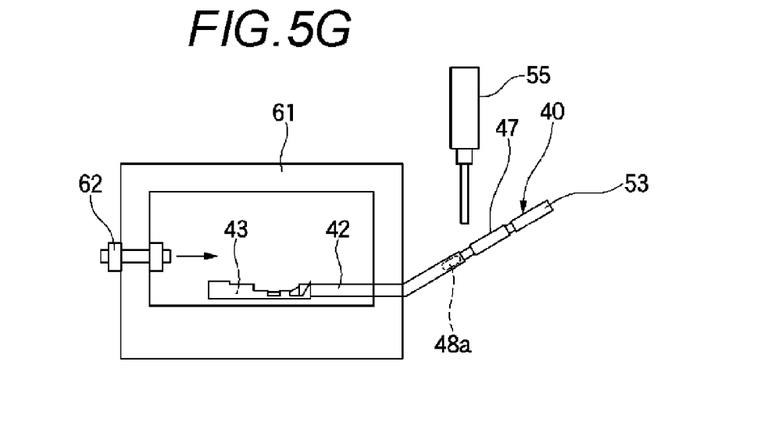
FIG. 5G is an explanatory diagram showing another one procedure for applying a water stop treatment to the insulating covered electric wire shown in FIG. 1.

Thus, when the strands of the core wire 41 or the gap between the core wire 41 and the insulation cover 42 are filled with a prescribed amount of the water stopping agent 48*a* (over a prescribed length), as shown in FIG. 5G, a dropping operation of the water stopping agent 48*a* by the water stopping agent drop nozzle 55 is stopped and an air exhausting (an air supply) operation to the closed vessel 61 by the exhaust nozzle 62 is also stopped. Then, after the water stopping agent 48*a* between the strands of the core wire 41 and in the gap between the core wire 41 and the insulation cover 42 is completely solidified, air is supplied to the closed vessel 61 through the exhaust nozzle 62 in a direction shown by an arrow (a pressurizing process) to return the closed vessel 61 to ordinary pressure (atmospheric pressure).

Figure 5H:
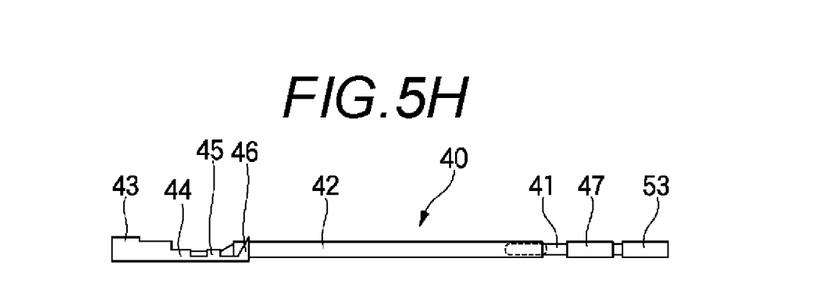
FIG. 5H is an explanatory diagram showing another one procedure for applying a water stop treatment to the insulating covered electric wire shown in FIG. 1.
Figure 5I:
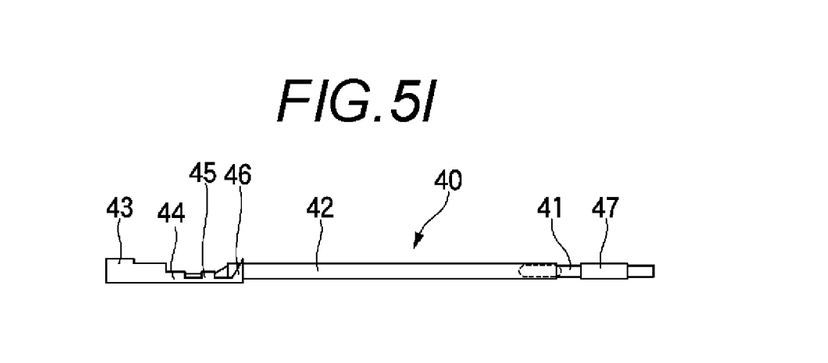
FIG. 5I is an explanatory diagram showing another one procedure for applying a water stop treatment to the insulating covered electric wire shown in FIG. 1.

Thus, the insulating covered electric wire 40 to which the water stop treatment is applied is taken out from the closed vessel 61. Then, the bent part is stretched straight as shown in FIG. 5H. Then, the sheath part 53 located in the end of the insulating covered electric wire 40 stretched straight is pulled out from the core wire 41 and discarded. As shown in FIG. 5I, only the sheath part 47 is left.

Then, the part of the core wire 41 from which the sheath part 53 is pulled out is connected to the one end of a separately-prepared drain wire 50 by using the joint terminal 49 as shown in FIG. 2. In the insulating covered electric wire shown in FIG. 2 to which the water stop treatment is applied, even when the drain wire 50 is watered, the water does not pass through the insulating covered electric wire from the drain wire 50 side to reach the ground terminal 43. Accordingly, the circuit board or circuit parts or electronic parts such as a connector to which the ground terminal is connected do not cause the insulation deterioration or the short-circuit accident.

As described above, according to the insulating covered electric wire of the present exemplary embodiment, in the insulating covered electric wire having the ground terminal used for connecting the drain wire 50, the insulation cover 42 with which the core wire 41 is covered is filled with the water stopping agent 48. Thus, even when the drain wire of the shield wire is watered, the water is prevented from moving and entering to the ground terminal through the insulating covered electric wire. The insulation deterioration or the short-circuit accident of the circuit board or circuit elements connected to the ground terminal can be avoided.

Further, since the water stopping agent dropped to the exposing part A from which a part of the core wire is exposed is infiltrated toward the other end opposite to the one end of the insulating covered electric wire 40 to which the joint terminal 49 is connected, the water stopping agent does not adhere to a part of the core wire 41 of the insulating covered electric wire 40 which comes into contact with the joint terminal 49. Accordingly, the water stopping agent can be prevented from checking an electric conduction or a connection strength between the core wire and the joint terminal.

The present invention is specifically described by referring to the specific exemplary embodiments. It is to be understood, however, to a person with ordinary skill in the art that the present invention may be variously changed or modified without departing from the spirit and scope of the present invention.

This application is based on Japanese Patent Application (No. 2009-250786) filed on Oct. 30, 2009, contents of which are incorporated herein as a reference.

REFERENCE SIGNS LIST

40: insulating covered electric wire
41: core wire
42: insulation cover
43: ground terminal
44, 45, 46: barrel
47, 53: sheath part
49: joint terminal
50: drain wire
51, 52: barrel
54, 61: closed vessel
55: water stopping agent drop nozzle
56: intake nozzle
62: exhaust nozzle

The invention claimed is:

1. An insulating covered electric wire, comprising:
a core wire; and
an insulation cover with which the core wire is covered, wherein
the core wire has one end exposed from the insulation cover, and an exposing part exposed from the insulation cover by peeling off the insulation cover is formed at an arbitrary position from the one end to the other end of the core wire,
a water stopping agent is filled from the exposing part toward the other end of the core wire,
the one end of the core wire is connected to a joint terminal,
the other end of the core wire is connected to a ground terminal, and
the water stopping agent is not filled from the exposing part toward the one end of the core wire so as to prevent that an electric conduction between the core wire and the joint terminal is checked by the water stopping agent.

2. The insulating covered electric wire according to claim 1, wherein a drain wire is connected to the joint terminal.

3. The insulating covered electric wire according to claim 2, wherein at least the joint terminal, the drain wire, the exposing part and a part of the insulation cover are covered with a binding tape.

4. The insulating covered electric wire according to claim 3, wherein the binding tape has no water-tightness.

5. The insulating covered electric wire according to claim 2, wherein the drain wire is devoid of the water stopping agent.

* * * * *